(12) United States Patent
Hiestand

(10) Patent No.: US 9,682,718 B2
(45) Date of Patent: Jun. 20, 2017

(54) BARROW

(71) Applicant: Metal Technics Limited, Maungaraki (NZ)

(72) Inventor: Bernard Anton Hiestand, Maungaraki (NZ)

(73) Assignee: METAL TECHNICS LIMITED, Maungaraki (NZ)

( * ) Notice: Subject to any disclaimer, the term of this patent is extended or adjusted under 35 U.S.C. 154(b) by 0 days.

(21) Appl. No.: 15/120,128

(22) PCT Filed: Feb. 19, 2015

(86) PCT No.: PCT/NZ2015/050015
§ 371 (c)(1),
(2) Date: Aug. 19, 2016

(87) PCT Pub. No.: WO2015/126263
PCT Pub. Date: Aug. 27, 2015

(65) Prior Publication Data
US 2017/0072977 A1    Mar. 16, 2017

(30) Foreign Application Priority Data
Feb. 20, 2014    (NZ) .......................... 621499

(51) Int. Cl.
*B62B 1/20*    (2006.01)
*B62B 5/06*    (2006.01)
(Continued)

(52) U.S. Cl.
CPC .............. *B62B 1/208* (2013.01); *B62B 1/008* (2013.01); *B62B 5/0079* (2013.01); *B62B 5/067* (2013.01); *B62B 2206/006* (2013.01)

(58) Field of Classification Search
CPC  B62B 1/20; B62B 1/208; B62B 1/008; B62B 5/0079; B62B 5/067; B62B 2206/006
(Continued)

(56) References Cited

U.S. PATENT DOCUMENTS 4,261,596 A    4/1981  Douglas
4,740,008 A    4/1988  Johnson
(Continued)

FOREIGN PATENT DOCUMENTS

CA            2262029 A1    7/2000
DE     202005000487        3/2005
(Continued)

*Primary Examiner* — John Walters
(74) *Attorney, Agent, or Firm* — Thomas Coester Intellectual Property

(57) ABSTRACT

A barrow (1) includes a tray (2); one or more wheels (12); one or more removable handles (16), each including a first handle coupling (40); one or more leg units (15), each including a leg (17) having a folded position in which the leg is folded against the tray and an unfolded position in which the leg extends downwards from the tray; and one or more second handle couplings (41) each configured to couple with one of the first handle couplings (40) to attach one of the one or more removable handles (16) to the barrow; wherein attachment of the one or more removable handles (16) to the barrow locks the one or more legs (17) in the unfolded position. The barrow may be convertible between a barrow configuration and a trailer configuration.

20 Claims, 15 Drawing Sheets

(51) Int. Cl.
  *B62B 1/00* (2006.01)
  *B62B 5/00* (2006.01)
(58) Field of Classification Search
  USPC .................. 280/653, 654, 655, 655.1, 659
  See application file for complete search history.

(56) References Cited

U.S. PATENT DOCUMENTS

| | | |
|---|---|---|
| 4,789,171 A | 12/1988 | Porter |
| 7,226,072 B2 * | 6/2007 | Shapiro .................. B62B 1/206 280/47.33 |
| 2014/0169921 A1 | 6/2014 | Carey |

FOREIGN PATENT DOCUMENTS

| | | |
|---|---|---|
| EP | 2045165 A3 | 11/2009 |
| FR | 2749254 A1 | 12/1997 |
| SU | 984914 A1 | 12/1982 |
| WO | WO 2006022728 | 3/2006 |

\* cited by examiner

BARROW

FIELD OF THE INVENTION

The invention relates to barrows, in particular but not exclusively to barrows with folding legs or convertible barrow—trailers.

BACKGROUND TO THE INVENTION

Barrows are used to assist a user in transporting various goods, such as firewood, garden waste, tools etc. A barrow typically includes a barrow tray or platform, one or two wheels, a pair of handles and a pair of legs. In a resting position, the legs and wheels together support the barrow tray. A user may lift the back of the barrow using the handles, lifting the legs from the ground such that the weight is borne by the wheels and by the user through the handles.

Barrows have also been designed to convert to a trailer configuration in which the barrow can be towed behind a vehicle. In such arrangements the barrow legs may be detachable. For example, U.S. Pat. No. 4,789,171 discloses a barrow that converts to a trailer configuration, with detachable legs/handlebars that can be repositioned to act as a trailer drawbar.

However, prior convertible barrows with detachable legs use mechanisms that are either unduly difficult to operate or impede the function of the barrow in one or both of its configurations. This can make the conversion between the barrow and trailer configurations difficult.

Reference to any prior art in this specification does not constitute an admission that such prior art forms part of the common general knowledge.

It is an object of the invention to provide a barrow that addresses or at least ameliorates one or more of the problems in the prior art, or at least to provide the public with a useful choice.

SUMMARY OF THE INVENTION

In a first aspect the invention provides a barrow including: a tray; one or more wheels; one or more removable handles, each including a first handle coupling; one or more leg units, each including a leg having a folded position in which the leg is folded against the tray and an unfolded position in which the leg extends downwards from the tray; and one or more second handle couplings each configured to couple with one of the first handle couplings to attach one of the one or more removable handles to the barrow; wherein attachment of the one or more removable handles to the barrow locks the one or more legs in the unfolded position.

Preferably each leg unit includes a shaft on which the leg is mounted, the shaft having an axis about which the leg rotates between the folded and unfolded positions.

Preferably the shaft is a rotating shaft.

Preferably a front end of the shaft provides one of the one or more second handle couplings.

Preferably the barrow includes a front plate or beam, wherein the front end of the shaft extends through the front plate or beam such that the second handle coupling is accessible from a front end of the barrow.

Preferably the front plate or beam supports the front end of the shaft, the barrow further including a support for supporting a back end of the shaft.

Preferably the shaft is mounted for limited movement along its own length.

Preferably the shaft is arranged to move along its own length between an extended position in which the front end of the shaft extends through the front plate or beam such that one of the removable handles may be attached to the second handle coupling, and a retracted position.

Preferably the shaft is biased towards the extended position.

Preferably the barrow includes a first stop surface that prevents movement of the shaft into the extended position unless the leg is in the unfolded position.

Preferably one of the removable handles, when coupled to the shaft by the first and second handle couplings, prevents movement of the shaft out of the extended position.

Preferably part of the removable handle engages against a surface of the front plate or beam to prevent movement of the shaft along its own length.

Preferably the barrow includes a second stop surface that prevents movement of the leg out of the unfolded position when the shaft is in the extended position.

Preferably one of the removable handles, when coupled to the shaft by the first and second handle couplings, prevents movement of the shaft out of the extended position, and a second stop surface prevents movement of the leg out of the unfolded position when the shaft is in the extended position, such that the attachment of the one of the removable handles locks the leg in the unfolded position.

Preferably the barrow includes a third stop surface arranged to limit downwards folding motion of the leg when the leg reaches the unfolded position.

Preferably the legs and shafts are formed from metal tube.

Preferably each leg is formed as a substantially U-shaped leg.

Preferably the first and second handle couplings form a twist-lock arrangement.

Preferably one of the first and second handle couplings includes a pair of opposed dog-leg slots, and the other of the first and second handle couplings includes a pair of opposed pins arranged and dimensioned to cooperate with the dog-leg slots.

Preferably one of the first and second handle couplings includes a recess, and the other of the first and second handle couplings includes a biased button arranged and dimensioned to cooperate with the recess to lock the first and second handle couplings together.

Preferably the recess is formed in the end of the shaft and the button is on the handle, and wherein the button is larger than the recess such that it is only partly received in the recess.

Preferably the barrow includes a support configured to retain the legs in the folded position.

Preferably the barrow includes two removable handles, two leg units, and two second handle couplings.

Preferably the barrow includes a removable drawbar, wherein the barrow is configurable as a trailer with the drawbar attached and the one or more legs in the folded position.

In a second aspect the invention provides a convertible barrow—trailer configurable as either a barrow or a trailer including: a tray; one or more wheels; one or more removable handles, each including a first handle coupling; one or more leg units, each including a leg having a folded position in which the leg is folded against the tray and an unfolded position in which the leg extends downwards from the tray; one or more second handle couplings each configured to couple with one of the first handle couplings to attach one of the one or more removable handles to the barrow; and a removable or retractable drawbar; wherein attachment of the one or more removable handles to the barrow locks the one or more legs in the unfolded position.

The convertible barrow—trailer of the second aspect may include any feature of the first aspect discussed above.

BRIEF DESCRIPTION OF THE DRAWINGS

The invention will now be described by way of example only, with reference to the accompanying drawings, in which.

DETAILED DESCRIPTION OF PREFERRED EMBODIMENTS

Figure 1:
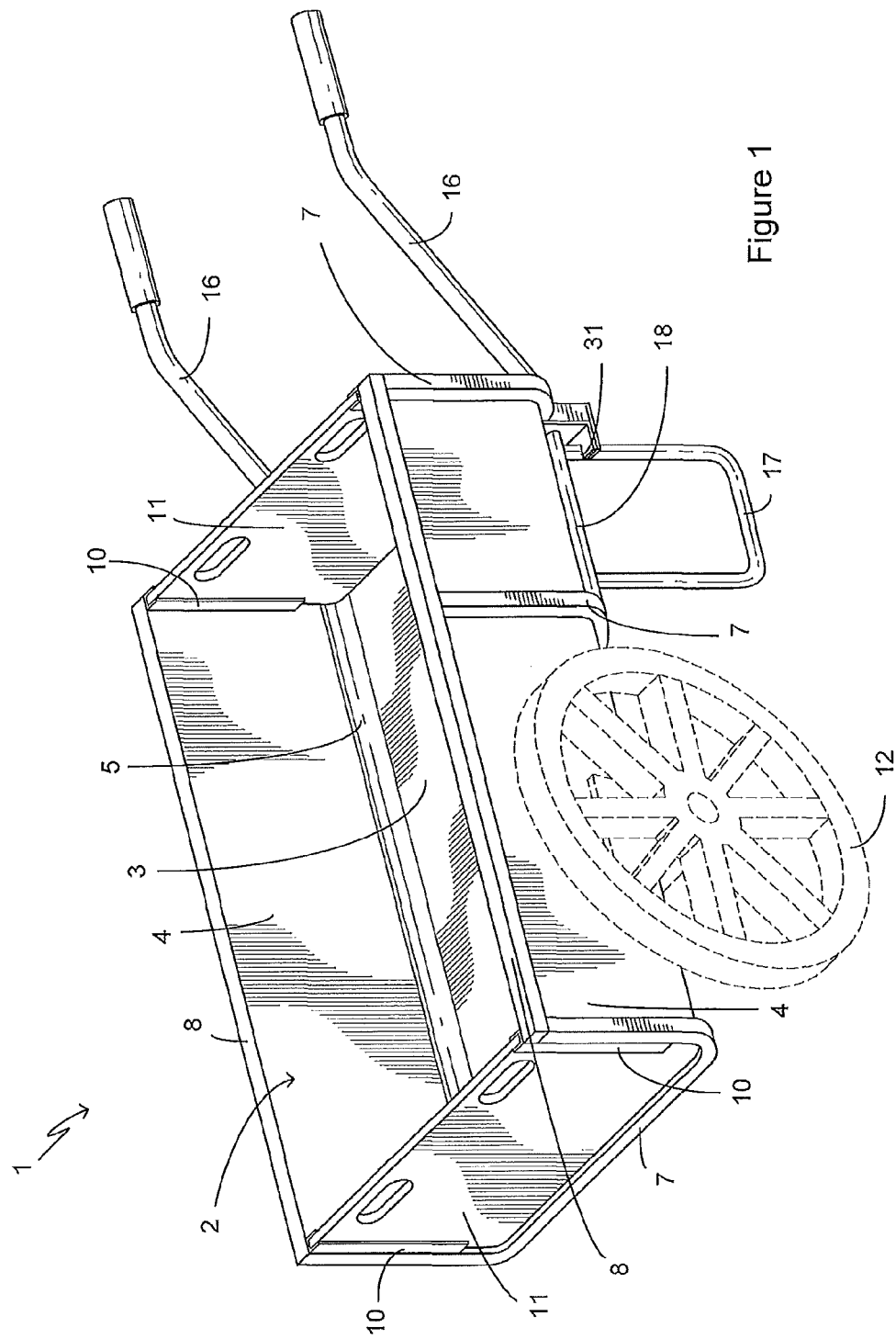
FIG. 1 shows a barrow according to one embodiment.

The drawings illustrate one embodiment of barrow 1, which in the preferred embodiment is a convertible barrow-trailer configurable as either a barrow or a trailer.

As shown in FIGS. 1 to 7, the Applicant's barrow 1 includes a tray 2, which in the embodiment shown includes a generally flat base 3 and a pair of opposed side walls 4. The base and side walls may be connected by a curved corner fitting 5. In one embodiment the base and side walls may be formed from plywood or similar material, while the curved corner fitting may be formed from metal, such as aluminium. The base 3 and side walls 4 may be supported by a frame, which may include a number of generally U-shaped members 7 spaced along the length of the tray 2 and a pair of longitudinal frame members 8.

The tray 2 may also include a pair of channels 10 at each end, such that removable panels 11 can be inserted to close each end of the tray.

In some embodiments it may be possible to close the tray by a suitable cover or lid. The tray may be open or enclosed. In some embodiments the tray may be flat. It is not the intention to limit the scope of invention to any particular type of tray.

In the embodiment shown a pair of wheels 12 are mounted to the tray 2 by an axle (not shown) mounted within an axle beam 13.

The barrow 1 also includes a folding leg arrangement 15 (see e.g. FIG. 2) and a number of handles 16. In the preferred embodiment the leg assembly includes two folding legs 17 and two handles 16.

As shown, each leg unit may include a leg 17 mounted to a shaft 18. Each shaft is supported at its front end by a front beam 19, which runs across the width of the tray 2, and at its rear end by a rear shaft support 20. This arrangement allows each shaft to rotate together with its respective leg, allowing the legs to be moved between the unfolded or extended position of FIGS. 1 to 7 and the folded or stowed position of FIGS. 8 to 14. This movement will be discussed in greater detail below.

The handles 16 are removable. To this end, an end of each handle is formed with a first handle coupling, and a second handle coupling is formed on the body of the barrow or, preferably, as part of the leg unit. The first and second handle couplings cooperate to removably mount the handle to the barrow. This mechanism will also be discussed in detail below.

FIGS. 8 to 14 show the Applicant's barrow in a second configuration where the handles 16 have been removed, the legs 17 moved to a folded or stowed position and a drawbar 22 attached to the body of the barrow. The drawbar may be attached by any suitable mechanism, preferably at two or more drawbar attachment points. In the embodiment shown a first drawbar attachment point 23 is mounted on the axle beam 13 and receives one end of the drawbar. A second drawbar attachment point 24 is formed on the front beam 19 and a draw-bolt 25 mounted on the drawbar 22 cooperates with this second point to attach the drawbar 22 to the front beam 19. As shown, the drawbar 22 may sit within a recess 26 in the front beam 19. The second end of the drawbar 22 may include any suitable coupling 27 for attachment to a towing vehicle.

Figure 2:
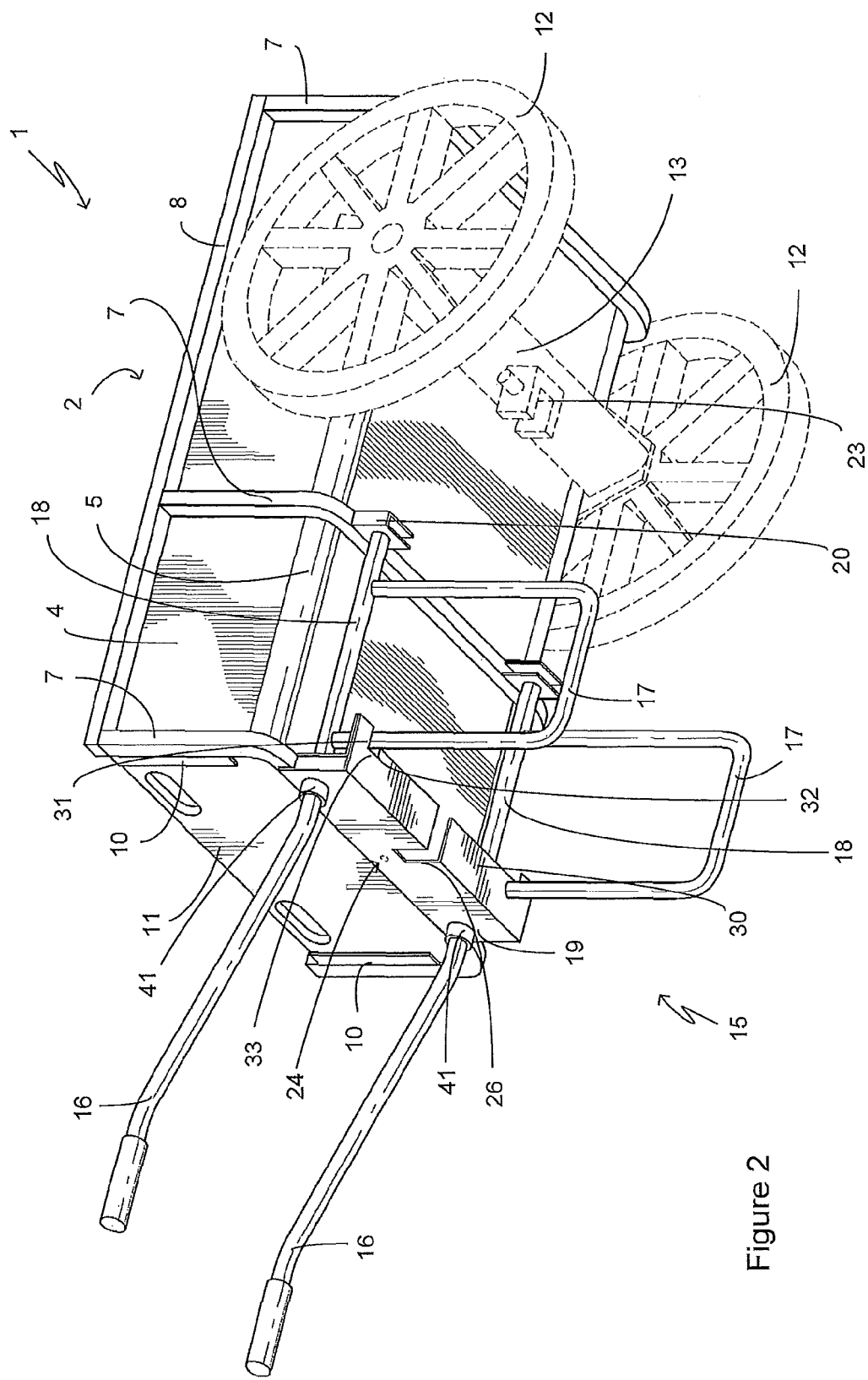
FIG. 2 is a bottom perspective view of the barrow of FIG. 1.
Figure 3:
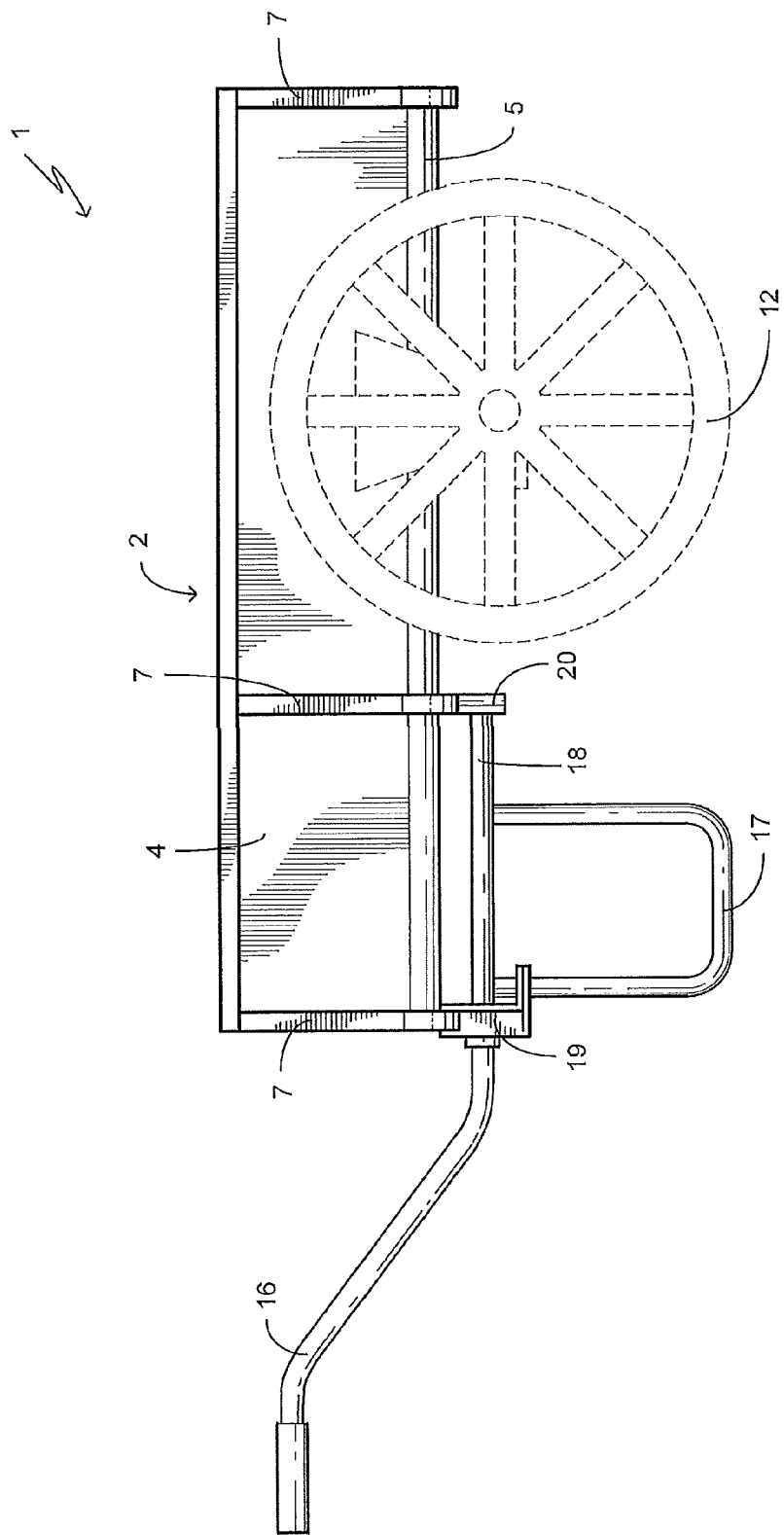
FIG. 3 is a side view of the barrow of FIG. 1.
Figure 4:
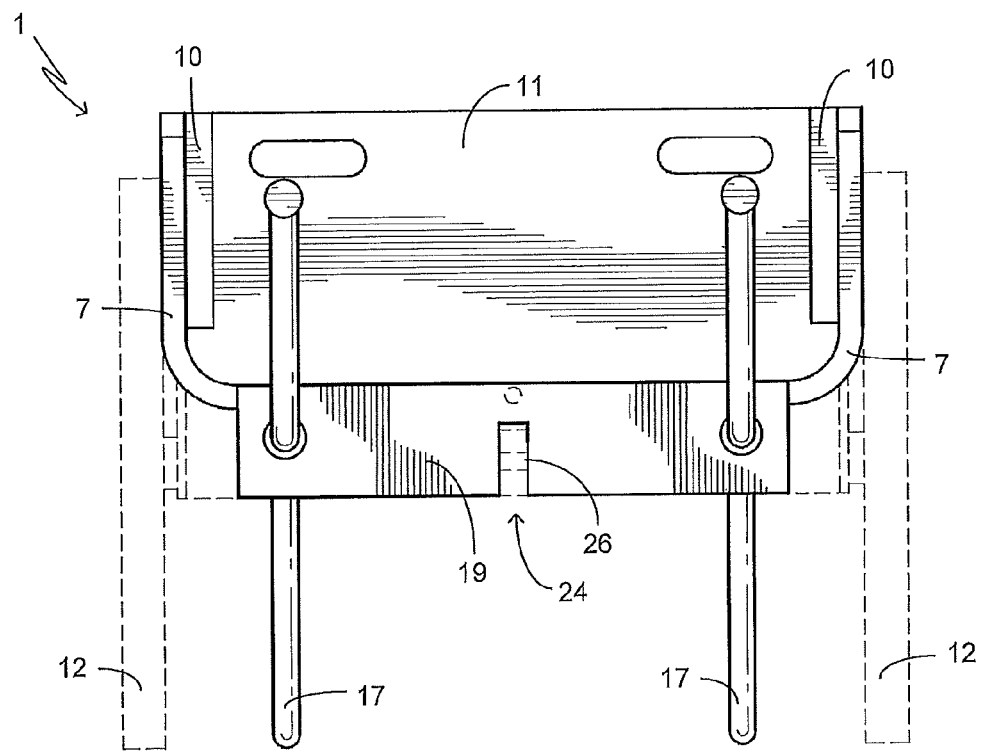
FIG. 4 is a front end view of the barrow of FIG. 1.
Figure 5:
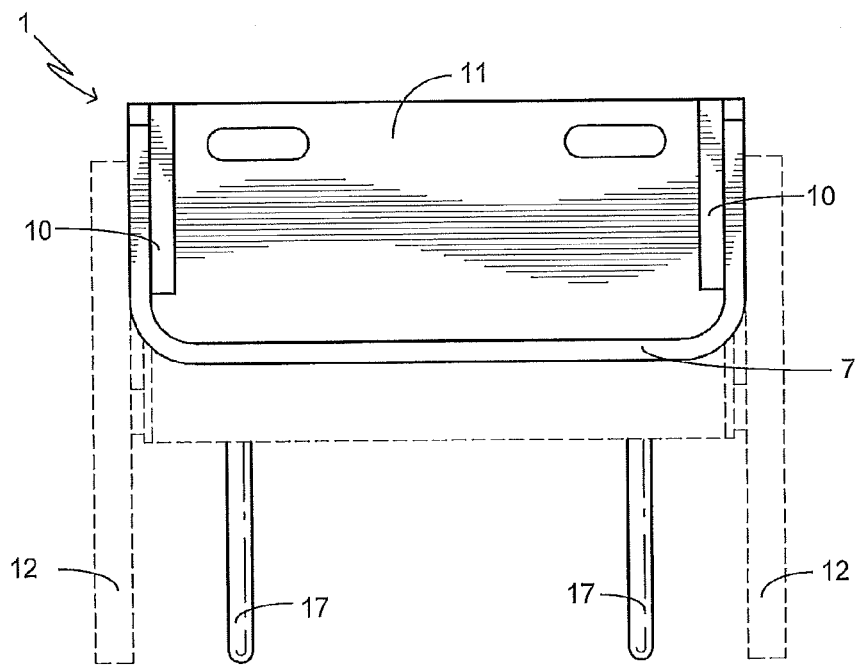
FIG. 5 is a rear end view of the barrow of FIG. 1.
Figure 6:
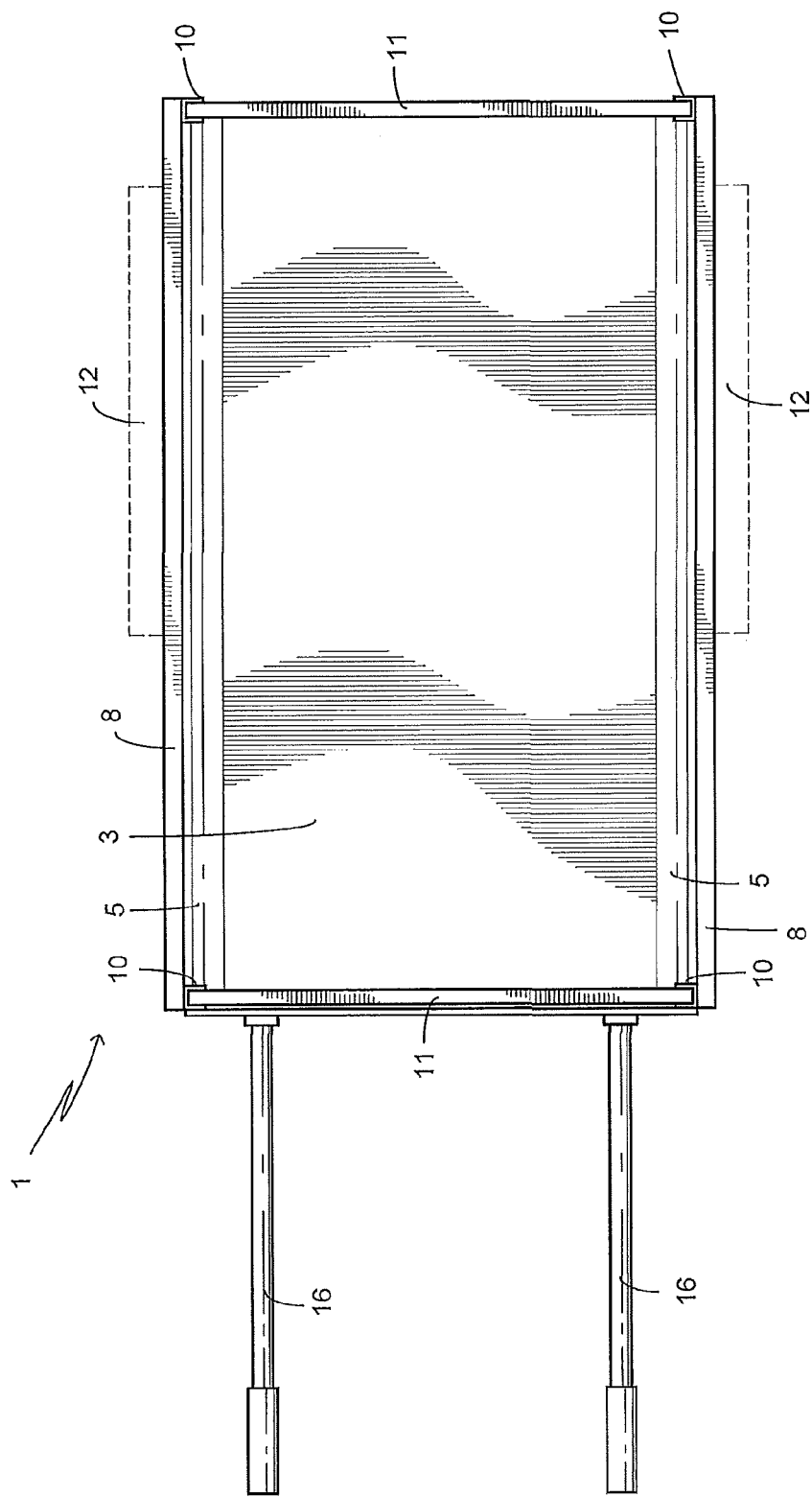
FIG. 6 is a top view of the barrow of FIG. 1.
Figure 7:
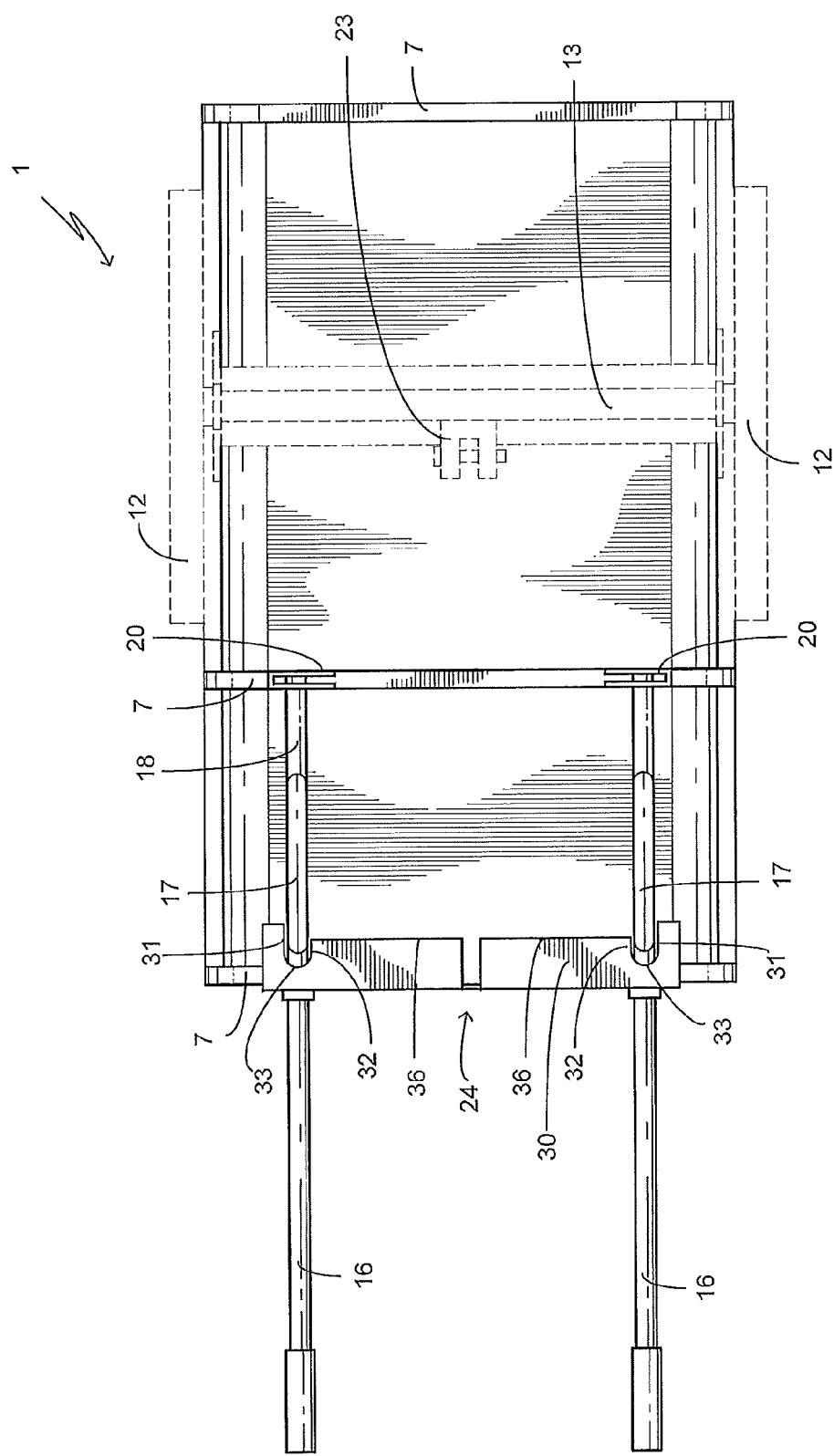
FIG. 7 is a bottom view of the barrow of FIG. 1.
Figure 8:
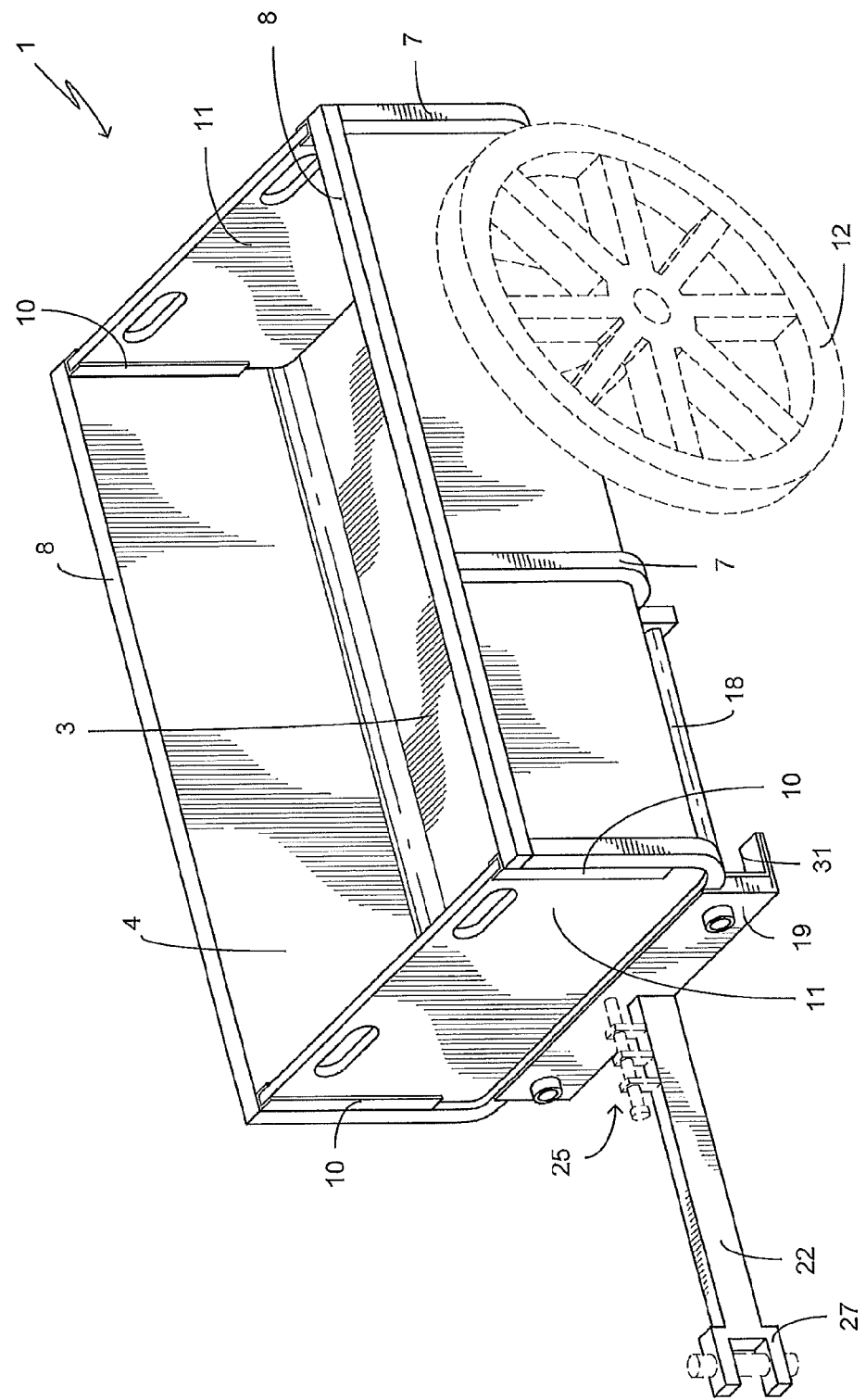
FIG. 8 is a top perspective view of the barrow of FIG. 1, reconfigured as a trailer.
Figure 9:
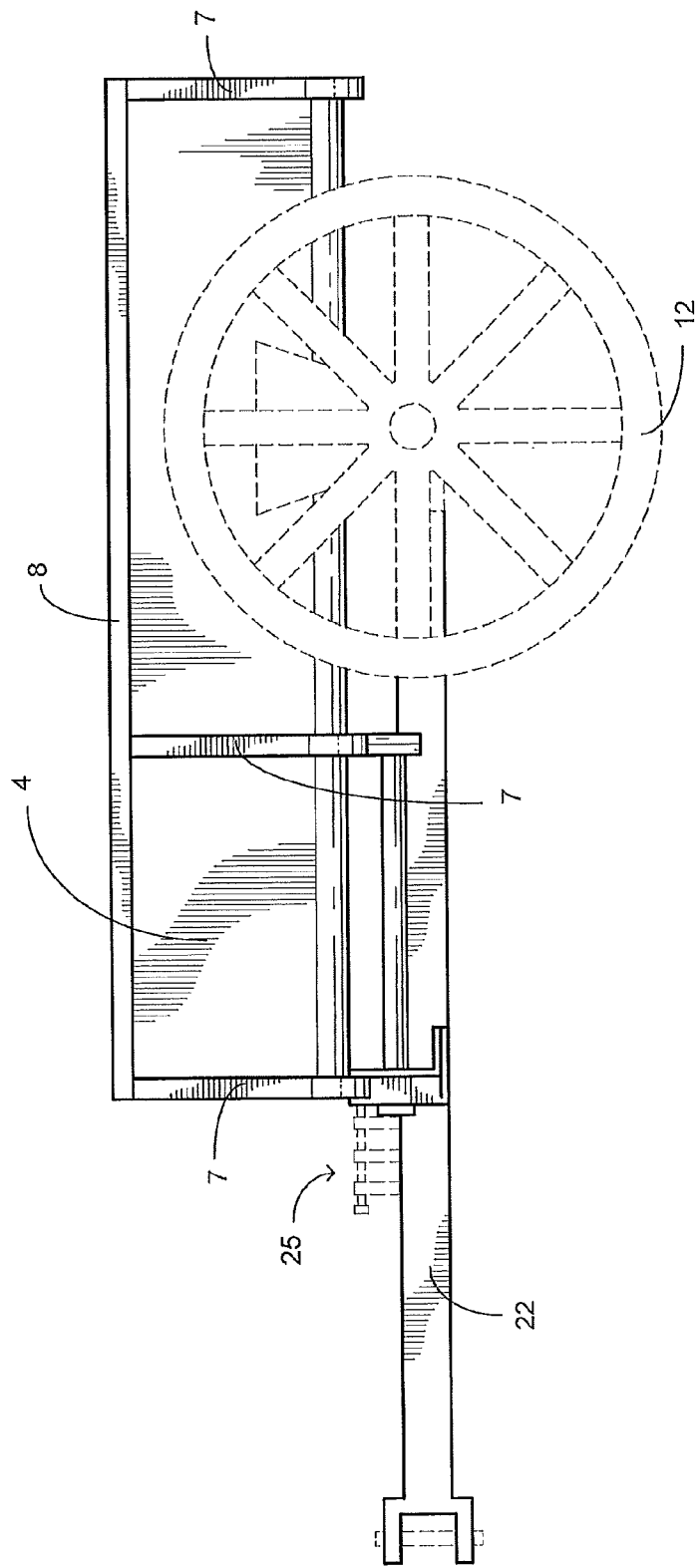
FIG. 9 is a side view of the trailer of FIG. 8.
Figure 10:
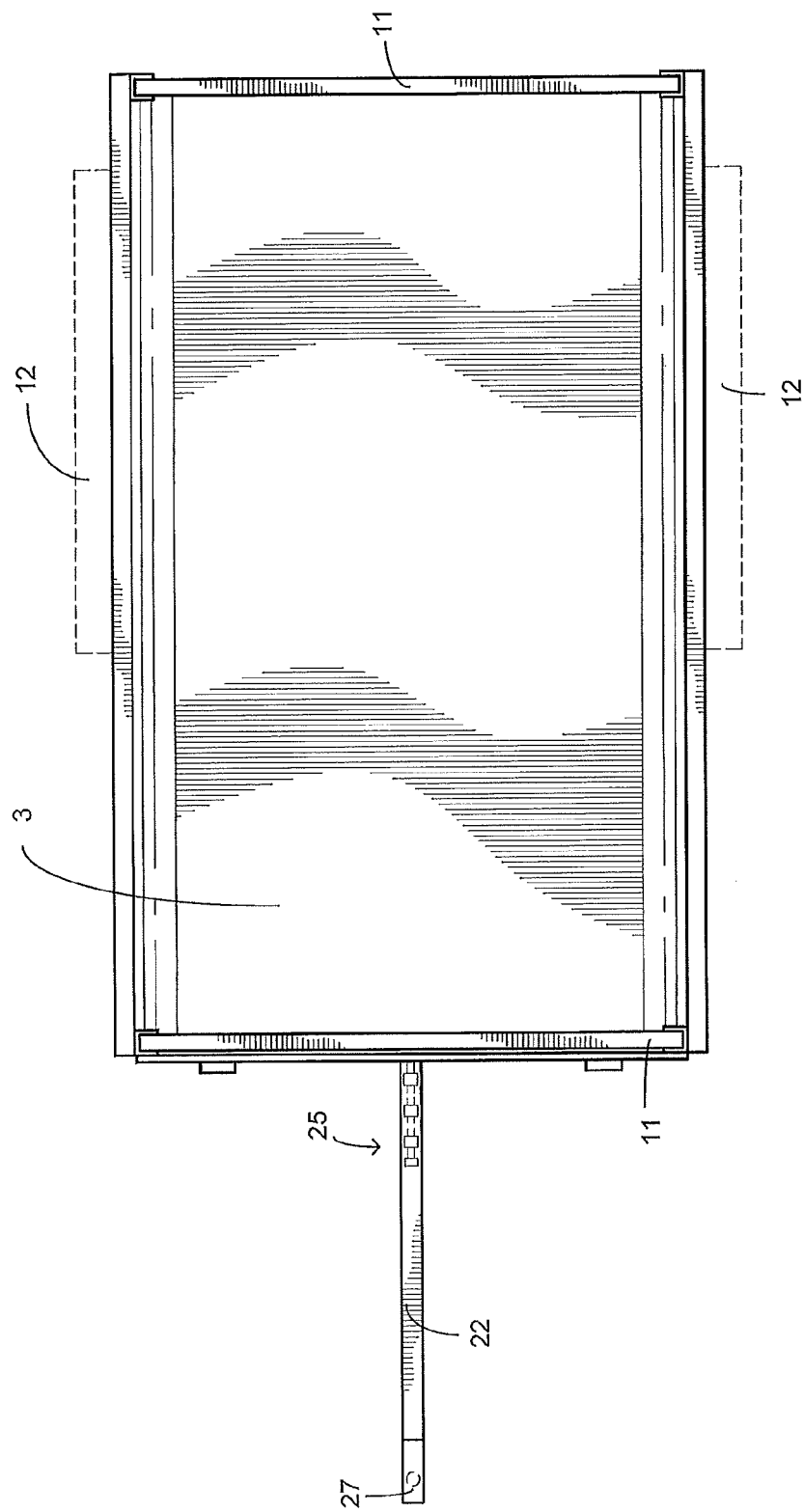
FIG. 10 is a top view of the trailer of FIG. 8.
Figure 11:
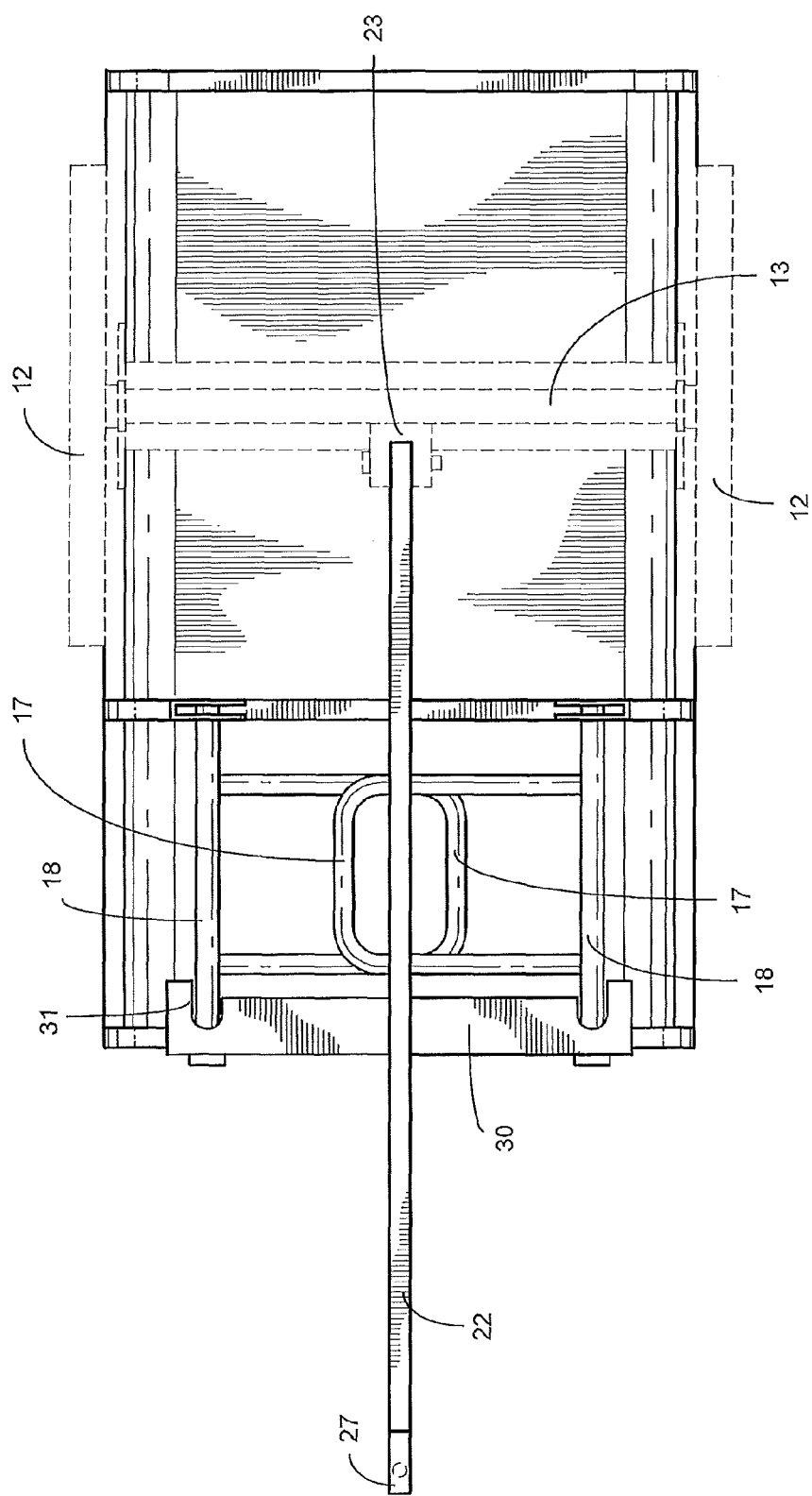
FIG. 11 is a bottom view of the trailer of FIG. 8.
Figure 12:
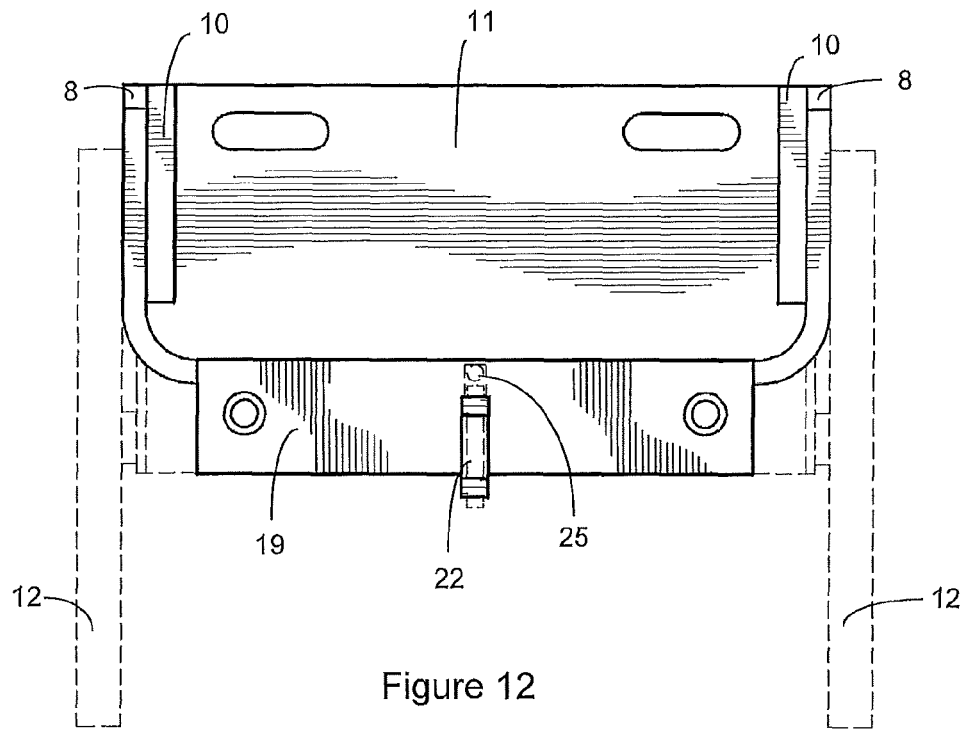
FIG. 12 is a front end view of the trailer of FIG. 8.
Figure 13:
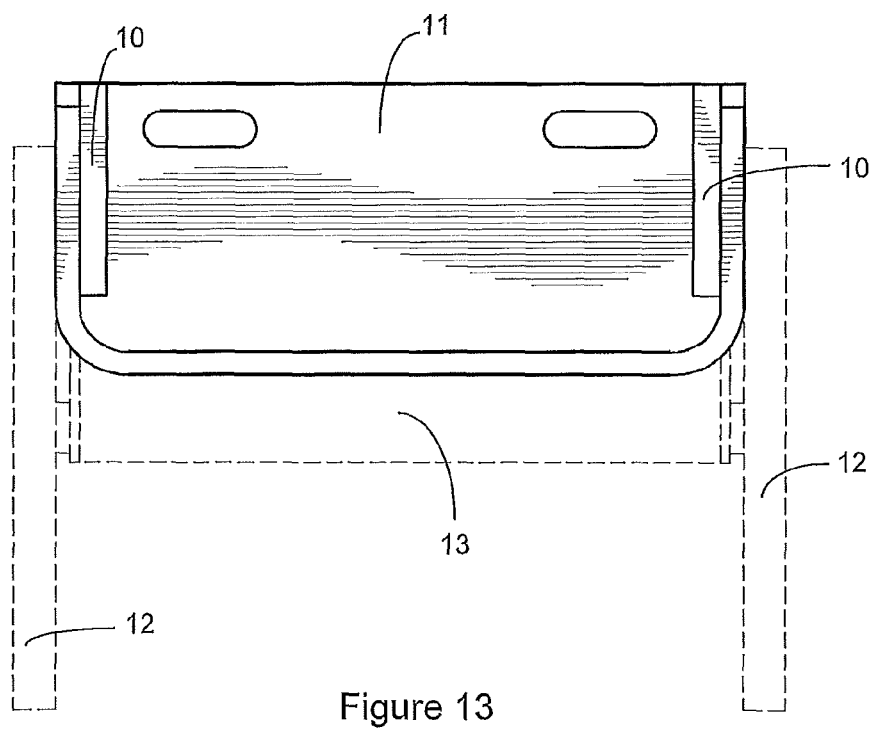
FIG. 13 is a rear end view of the trailer of FIG. 8.

FIGS. 2, 7 and 11 show a stop plate 30, which may be mounted (e.g. riveted) on the front plate or beam 19. The stop plate 30 may provide stop surfaces 31, 32, 33, 36 limiting the motion of each leg 17 as discussed below.

The motion of the legs from the folded to the unfolded position will now be described.

In the folded position, the legs may be retained by a suitable retaining mechanism (not shown), or they may be retained in the folded position by the drawbar 22. As shown in FIG. 11, for example, the legs 17 sit on top of the drawbar 22.

Figure 14:
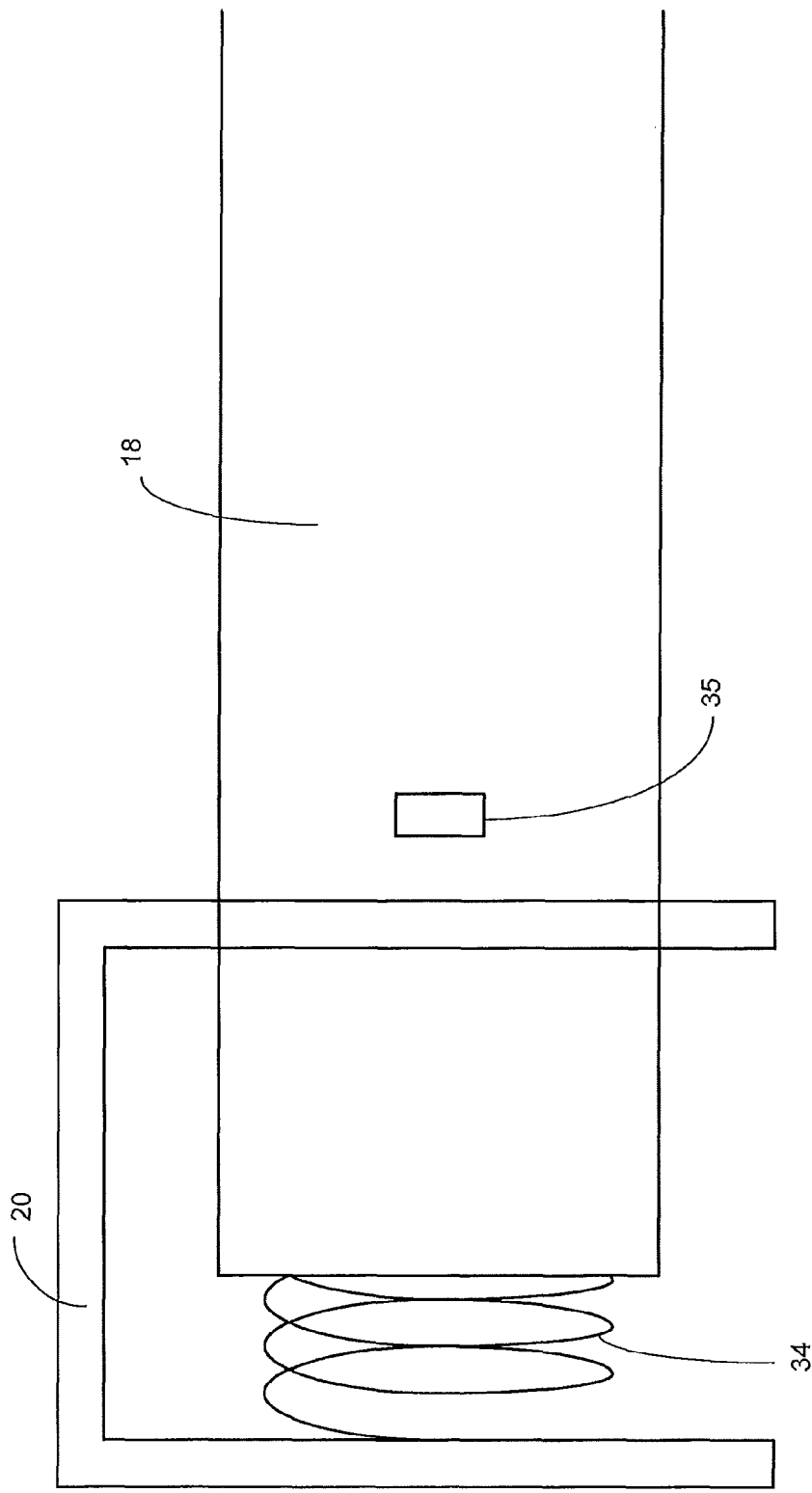
FIG. 14 is a schematic view of the shaft and rear shaft support of the barrow of FIG. 1.

The shaft 18 is preferably biased to move along its length towards the front end of the barrow 1. This may be achieved by mounting a suitable compression spring 34 in the rear shaft support 20, as shown in FIG. 14. A stop 35 may be formed in the wall of the shaft 18, in order to make an internal surface for an end of the spring 34 to bear against. When the drawbar is removed, this bias will tend to cause the legs to sit on top of a lip provided by the stop plate 30.

A user then moves the legs back against the bias provided by spring 34, and unfolds the legs. Axial motion of the legs towards the front of the barrow will be resisted by a stop surface 36 until the legs are completely unfolded. When the legs reach the unfolded position, an outer stop surface 31 acts against each leg 17 to prevent further rotational movement. A recess in the stop plate 30 allows motion of the shaft 18 along its length (i.e. motion along the shaft's axis of rotation). The spring 34 therefore causes the leg 17 and shaft 18 to moved forward until the leg 17 abuts an axial stop surface 33, which acts to prevent further forwards movement of the leg 17 and shaft 18. Further, in the unfolded position an inner stop surface 32 acts against each leg 17 to prevent that leg from rotating back towards the folded or stowed position.

Any other arrangement providing stop surfaces limiting movement in a similar way may be used.

Attachment of the handles to the barrow locks the legs in this unfolded position, as will become apparent.

One embodiment of handle connection will now be described with reference to FIGS. 15 to 17. For clarity, this connection mechanism is not shown in FIGS. 1 to 13.

Figure 15:
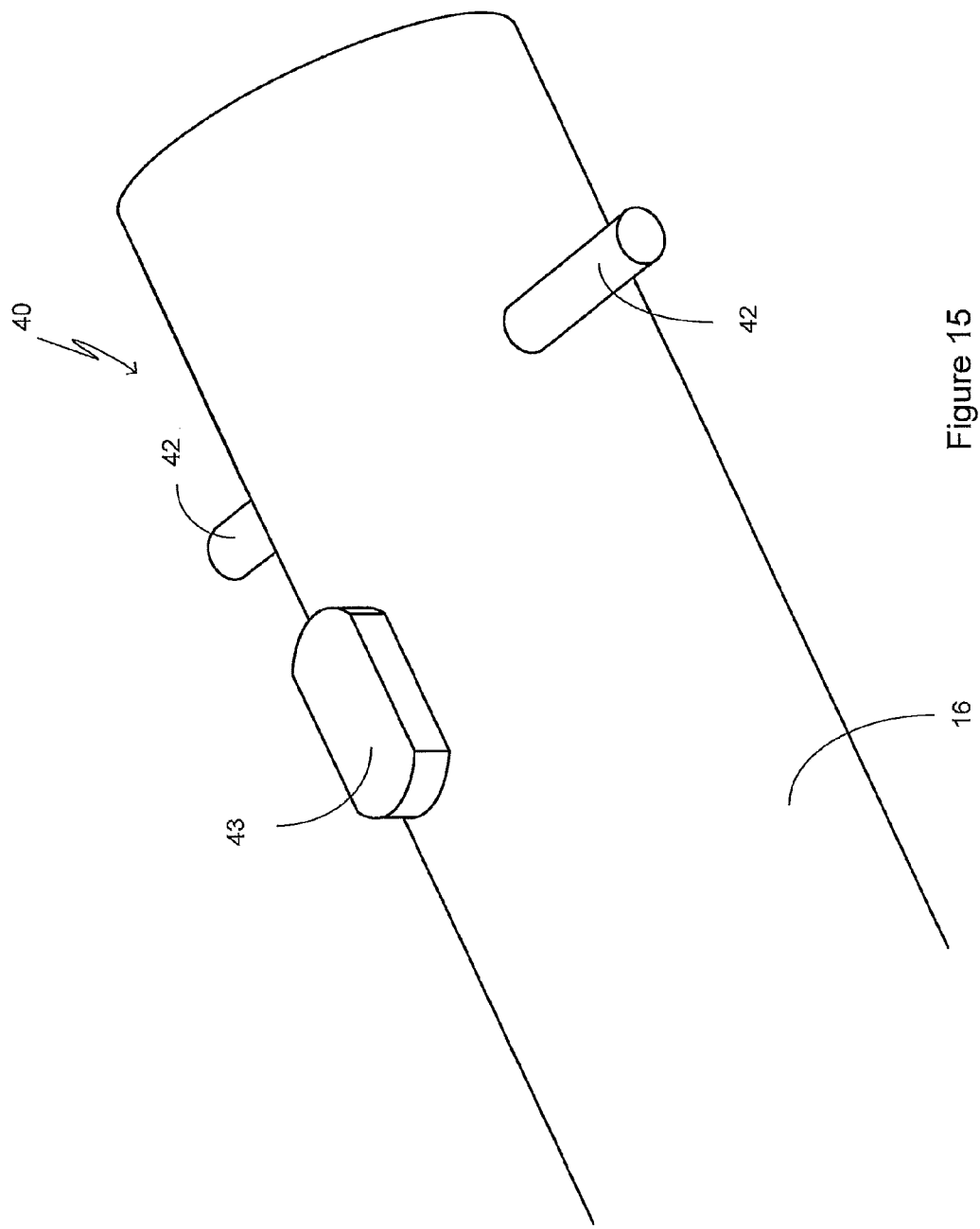
FIG. 15 shows a first handle coupling of the barrow of FIG. 1.

FIG. 15 shows a first handle coupling 40 formed in one end of each handle 16. FIG. 16 shows a second handle coupling 41 formed in the front end of the shaft 18. FIG. 17 shows the first and second handle couplings 40, 41 coupled to removably attach a handle 16 to the body of the barrow.

Referring to FIG. 15, the first handle coupling 40 may include a pair of projecting pins 42. These pins may be formed by a single rod passing through two apertures in a tubular handle 16.

Further, the first handle coupling may include a biased button 43, which can be depressed to a position flush with the surface of the handle 16 and is biased to the protruding position shown.

Figure 16:
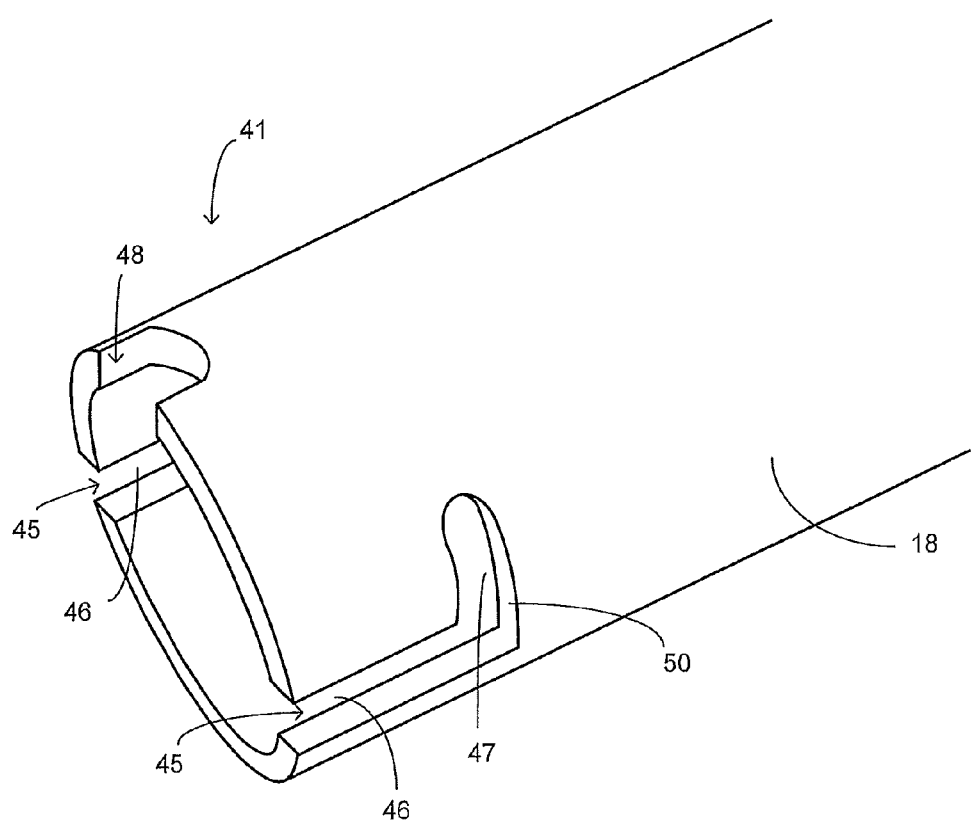
FIG. 16 shows a second handle coupling of the barrow of FIG. 1.
Figure 17:
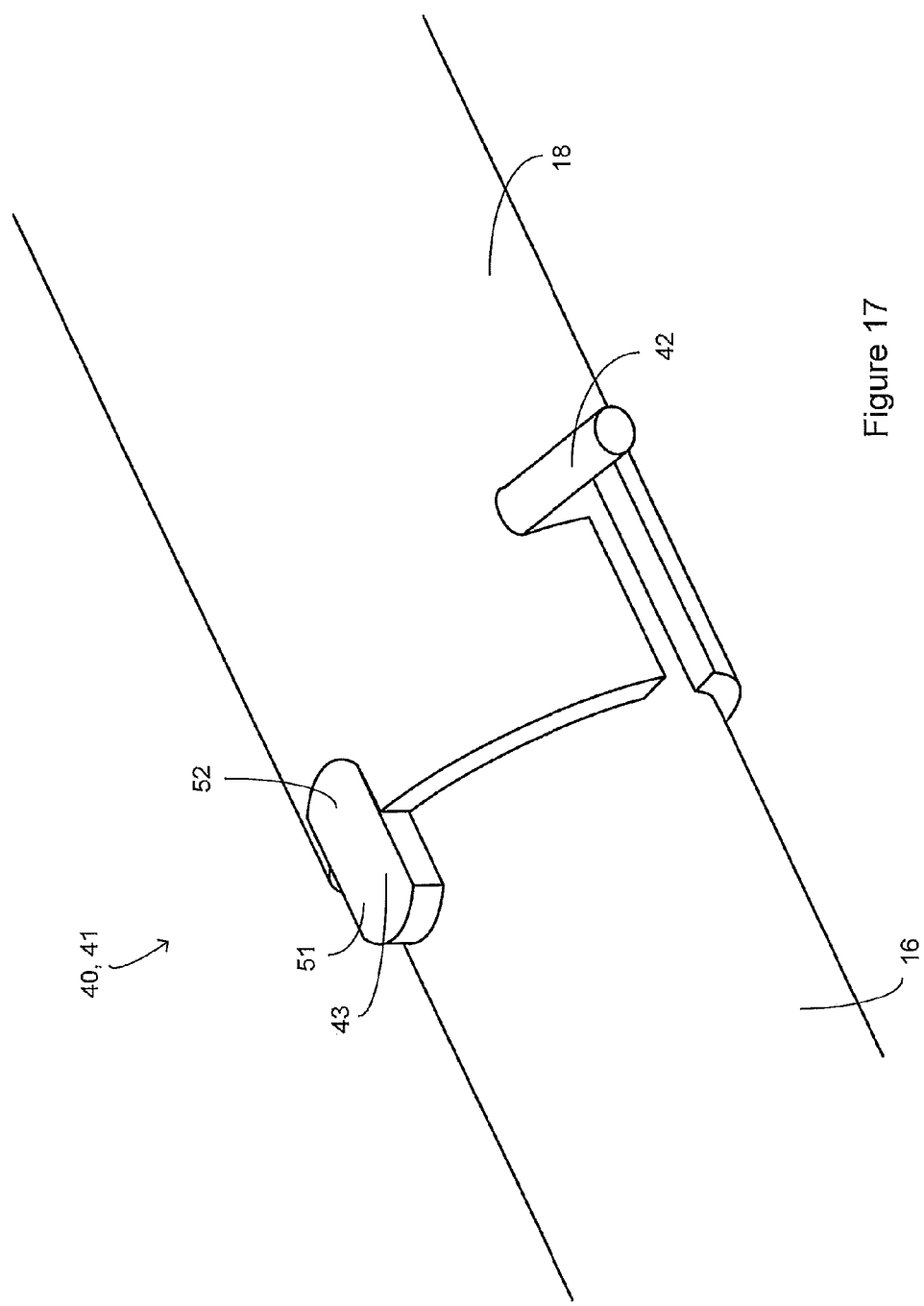
FIG. 17 shows the coupled first and second handle couplings of FIGS. 15 and 16.

Referring to FIG. 16, the second handle coupling 41 may include a pair of opposed "dog leg" slots 45, of which only one is wholly visible in FIG. 16. Each dog leg slot 45 includes a first portion 46 extending parallel to the shaft's axis or length, and a second portion 47 extending around the circumference of the shaft 18.

The second handle coupling may also include a recess 48 formed in the end of the shaft 18.

A user may attach a handle to the barrow as follows.

First, the user aligns the pins 42 with the first portions 46 of the dog leg slots 45 and depresses the button 43. The handle 16 may then be moved parallel to the length of the shaft 18 until the pins 42 abut an end surface 50 of the slot 45. The depressed button 43 will now be positioned partially inside the tubular shaft 18, but offset from the recess 48.

The user now twists the handle 16 relative to the shaft 18. This causes the pins 42 to move along the second portions 47 of the dog leg slots 45. This movement continues until the button 43 aligns with the recess 48, at which point it will move under its bias to the protruding position and will engage with the recess 48 (as shown in FIG. 17) to prevent rotation of the handle 16 relative to the shaft 18. The pins 42 cooperate with the second portions 47 of the slots 45 to prevent lengthwise movement of the handle 16 relative to the shaft 18. In the position of FIG. 17, the handle is therefore securely mounted to the shaft 18.

In order to remove the handle 16 from the barrow 1, the user will depress the button 43 such that it disengages from the recess 48. The button may be larger (e.g. longer) than the recess, making it easier to press. For example, as shown in FIG. 17, the button 43 may be elongate such that a first portion 51 is positioned outside the recess and a second portion 52 is within the recess. If the button 43 were entirely within the recess the surface of the shaft 18 would make it more difficult for a user to depress.

With the button 43 depressed, the user may rotate the handle to move the pins 42 along the second portion 47 of slot 45, then withdraw the handle from the shaft, with the pins moving along the first portion 46 of the slot 45.

In the preferred embodiment the first and second handle couplings therefore provide a twist lock connection of the handle to the body of the barrow, and in particular to the shaft 18. However, in other embodiments any suitable coupling providing for removable attachment of the handles may be used, including other forms of twist-lock coupling, threaded couplings, push fits, or any other suitable coupling.

As shown in FIG. 2, for example, the front end of the shaft 18 carrying the second handle coupling 41 extends through the front beam 19. Preferably the end surfaces 50 of the slots 45 are substantially aligned with the front surface of the front beam 19, when the legs 17 are in the unfolded position and abutted against the axial stop surface 33. When the handles 16 are attached, the pins 42 will therefore act against the front surface of the front beam 19 to prevent backwards movement of the shafts 18. In this position rotation of the legs 17 and shafts 18 is also prevented by the inner and outer stop surfaces 32, 31. Attachment of the handles therefore locks the legs in the unfolded position.

The Applicant's barrow therefore provides a single mechanism that attaches the handles and locks the legs in place. This allows easy conversion between the barrow and trailer configurations. The Applicant's barrow also provides excellent performance in both barrow and trailer configurations. Further, the folding nature of the leg assembly allows for compact packaging for shipping, with the legs folded up, handles and wheels removed.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A barrow including:
   i. a tray;
   ii. one or more wheels;
   iii. one or more removable handles, each including a first handle coupling;
   iv. one or more leg units, each including a leg having a folded position in which the leg is folded against the tray and an unfolded position in which the leg extends downwards from the tray; and
   v. one or more second handle couplings each configured to couple with one of the first handle couplings to attach one of the one or more removable handles to the barrow;

wherein attachment of the one or more removable handles to the barrow locks the one or more legs in the unfolded position.

2. A barrow as claimed in claim 1 wherein each leg unit includes a shaft on which the leg is mounted, the shaft having an axis about which the leg rotates between the folded and unfolded positions.

3. A barrow as claimed in claim 2 wherein the shaft is a rotating shaft.

4. A barrow as claimed in claim 2 wherein a front end of the shaft provides one of the one or more second handle couplings.

5. A barrow as claimed in claim 4 including a front plate or beam, wherein the front end of the shaft extends through the front plate or beam such that the second handle coupling is accessible from a front end of the barrow.

6. A barrow as claimed in claim 5 wherein the shaft is arranged to move along its own length between an extended position in which the front end of the shaft extends through the front plate or beam such that one of the removable handles may be attached to the second handle coupling, and a retracted position.

7. A barrow as claim in claim 6 wherein the shaft is biased towards the extended position.

8. A barrow as claimed in claim 6 including a first stop surface that prevents movement of the shaft into the extended position unless the leg is in the unfolded position.

9. A barrow as claimed in claim 6 wherein one of the removable handles, when coupled to the shaft by the first and second handle couplings, prevents movement of the shaft out of the extended position.

10. A barrow as claimed in claim 9 wherein part of the removable handle engages against a surface of the front plate or beam to prevent movement of the shaft along its own length.

11. A barrow as claimed in claim 6 wherein one of the removable handles, when coupled to the shaft by the first and second handle couplings, prevents movement of the shaft out of the extended position, and a second stop surface prevents movement of the leg out of the unfolded position when the shaft is in the extended position, such that the attachment of the one of the removable handles locks the leg in the unfolded position.

12. A barrow as claimed in claim 2 wherein the leg and shaft are formed from metal tube.

13. A barrow as claimed in claim 1 including a third stop surface arranged to limit downwards folding motion of the leg when the leg reaches the unfolded position.

14. A barrow as claimed in claim 1 wherein each leg is formed as a substantially U-shaped leg.

15. A barrow as claimed in claim 1 wherein the first and second handle couplings form a twist-lock arrangement.

16. A barrow as claimed in claim 15 wherein one of the first and second handle couplings includes a pair of opposed dog-leg slots, and the other of the first and second handle couplings includes a pair of opposed pins arranged and dimensioned to cooperate with the dog-leg slots.

17. A barrow as claimed in claim 15 wherein one of the first and second handle couplings includes a recess, and the other of the first and second handle couplings includes a biased button arranged and dimensioned to cooperate with the recess to lock the first and second handle couplings together.

18. A barrow as claimed in claim 1 having two removable handles, two leg units, and two second handle couplings.

19. A barrow as claimed in claim 1 further including a removable drawbar, wherein the barrow is configurable as a trailer with the drawbar attached and the one or more legs in the folded position.

20. A convertible barrow—trailer configurable as either a barrow or a trailer, including:
  i. a tray;
  ii. one or more wheels;
  iii. one or more removable handles, each including a first handle coupling;
  iv. one or more leg units, each including a leg having a folded position in which the leg is folded against the tray and an unfolded position in which the leg extends downwards from the tray;
  v. one or more second handle couplings each configured to couple with one of the first handle couplings to attach one of the one or more removable handles to the barrow; and
  vi. a removable or retractable drawbar;

wherein attachment of the one or more removable handles to the barrow locks the one or more legs in the unfolded position.

* * * * *